United States Patent
Bruening et al.

(10) Patent No.: US 8,194,842 B2
(45) Date of Patent: *Jun. 5, 2012

(54) IMPLEMENTING FEATURE INTERACTIONS BETWEEN AN AIN-BASED SERVICE AND A SWITCH-BASED FORWARDING SERVICE

(75) Inventors: Gregory Bruening, Boulder, CO (US); Marcus Roman, Louisville, CO (US); Don Gillespie, Boulder, CO (US)

(73) Assignee: Qwest Communications International Inc., Denver, CO (US)

(*) Notice: Subject to any disclaimer, the term of this patent is extended or adjusted under 35 U.S.C. 154(b) by 355 days.

This patent is subject to a terminal disclaimer.

(21) Appl. No.: 12/401,923

(22) Filed: Mar. 11, 2009

(65) Prior Publication Data

US 2009/0168988 A1 Jul. 2, 2009

Related U.S. Application Data

(63) Continuation of application No. 09/785,864, filed on Feb. 16, 2001.

(51) Int. Cl.
 *H04M 3/42* (2006.01)
 *H04M 3/54* (2006.01)
 *H04M 7/00* (2006.01)

(52) U.S. Cl. ......... 379/207.02; 379/211.02; 379/221.09; 379/221.12; 379/221.14

(58) Field of Classification Search ............. 379/211.02, 379/211.04, 221.12, 221.09, 221.14, 221.08, 379/221.1, 207.02

See application file for complete search history.

(56) References Cited

U.S. PATENT DOCUMENTS

| 5,583,564 | A | * | 12/1996 | Rao et al. ................... 348/14.01 |
| 5,917,817 | A | | 6/1999 | Dunn et al. |
| 5,923,744 | A | | 7/1999 | Cheng |
| 6,505,163 | B1 | | 1/2003 | Zhang et al. |
| 6,711,243 | B1 | | 3/2004 | Holt |
| 6,907,111 | B1 | * | 6/2005 | Zhang et al. ............... 379/88.02 |
| 7,519,172 | B2 | | 4/2009 | Bruening |
| 2002/0183041 | A1 | | 12/2002 | Wallenius et al. |

OTHER PUBLICATIONS

U.S. Appl. No. 09/785,864, Office Action dated Jun. 3, 2004, 6 pgs.
U.S. Appl. No. 09/785,864, Office Action dated Dec. 28, 2004, 7 pgs.
U.S. Appl. No. 09/785,864, Office Action dated Jul. 5, 2005, 5 pgs.
U.S. Appl. No. 09/785,864, Office Action dated Dec. 15, 2005, 7 pgs.
U.S. Appl. No. 09/785,864, Advisory Action dated Apr. 6, 2006, 3 pgs.

(Continued)

*Primary Examiner* — Harry Hong
(74) *Attorney, Agent, or Firm* — Swanson & Bratschun, L.L.C.

(57) ABSTRACT

The present invention provides a method and system for implementing feature interactions between an AIN-based service and a switch-based call-forwarding service. In the present invention, the switch-based call-forwarding generates an Off-Hook Delay (OHD) trigger. In response, the SSP suspends call processing and sends the forward-to number to the SCP. Based upon the SCP's determination of whether the forward-to number is for voicemail and other criteria such as time of day, day of the week, etc, the SCP determines whether the switch-based call-forward should be permitted or inhibited.

20 Claims, 2 Drawing Sheets

OTHER PUBLICATIONS

U.S. Appl. No. 09/785,864, Office Action dated Aug. 9, 2006, 6 pgs.
U.S. Appl. No. 09/785,864, Office Action dated Jan. 24, 2007, 9 pgs.
U.S. Appl. No. 09/785,864, Advisory Action dated Apr. 20, 2007, 4 pgs.
U.S. Appl. No. 09/785,864, Notice of Panel Decision dated Aug. 2, 2007, 2 pgs.
U.S. Appl. No. 09/785,864, Office Action dated Oct. 17, 2007, 9 pgs.
U.S. Appl. No. 09/785,864, Office Action dated Apr. 16, 2008, 7 pgs.
U.S. Appl. No. 09/785,864, Notice of Allowance dated Dec. 3, 2008, 4 pgs.

* cited by examiner

IMPLEMENTING FEATURE INTERACTIONS BETWEEN AN AIN-BASED SERVICE AND A SWITCH-BASED FORWARDING SERVICE

This application is a continuation of co-pending U.S. patent application Ser. No. 09/785,864, filed Feb. 16, 2001 by Bruening et al. and entitled "Implementing Feature Interactions Between An AIN-Based Service And A Switch-Based Forwarding Service."

BACKGROUND OF THE INVENTION

The present invention relates generally to Advanced Intelligent Networks and more particularly to implementing feature interactions between an AIN-based service and a switch-based forwarding service.

Many new Advanced Intelligent Network (AIN) services are providing call forwarding for customers who also have voicemail services on their line. A typical scenario might be one in which a terminating AIN service has been assigned to a subscriber's line and the AIN service wants to allow the call to proceed to the customer's line. However, the customer also has a voicemail feature which requires the use of a switch-based call forwarding service. The switch will then forward the call via a switch-based call forwarding service to the customer's voicemail server. However, the functionality of the AIN service may need to preclude the switch from forwarding the call at particular times of the day or based on other screening criteria.

For example, with multi-line extension service, calls to a subscriber's telephone number are forwarded to a user's wireless telephone number as well as the user's wired subscriber line. In that case, both lines ring simultaneously and the call can be answered from either line. However, if the wired subscriber line has a switch-based call-forward to voicemail, the call may be forwarded to voicemail before the user can answer the call on the wireless line.

Currently, a way to solve the problem is to remove the voicemail forwarding from the customer's line and implement the call forwarding to voicemail as part of the AIN service. The AIN service can then determine whether the call should go to voicemail, or directly to the customer's line or perhaps should not proceed at all. However, this present solution is complex and requires the removal of the standard switch-based call forwarding service.

SUMMARY OF THE INVENTION

The present invention provides a method and system for implementing feature interactions between an AIN-based service and a switch-based service, such as call-forwarding. In the present invention, the switch-based call-forwarding generates an Off-Hook Delay (OHD) trigger. In response, the SSP suspends call processing and sends the forward-to number to the SCP. Based upon the SCP's determination of whether the forward-to number is for voicemail and other criteria such as time of day, day of the week, etc, the SCP determines whether the switch-based call-forward should be permitted or inhibited. The SSP then either proceeds with the switch-based call forward or inhibits the call-forward in accordance with the instructions from the SCP.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
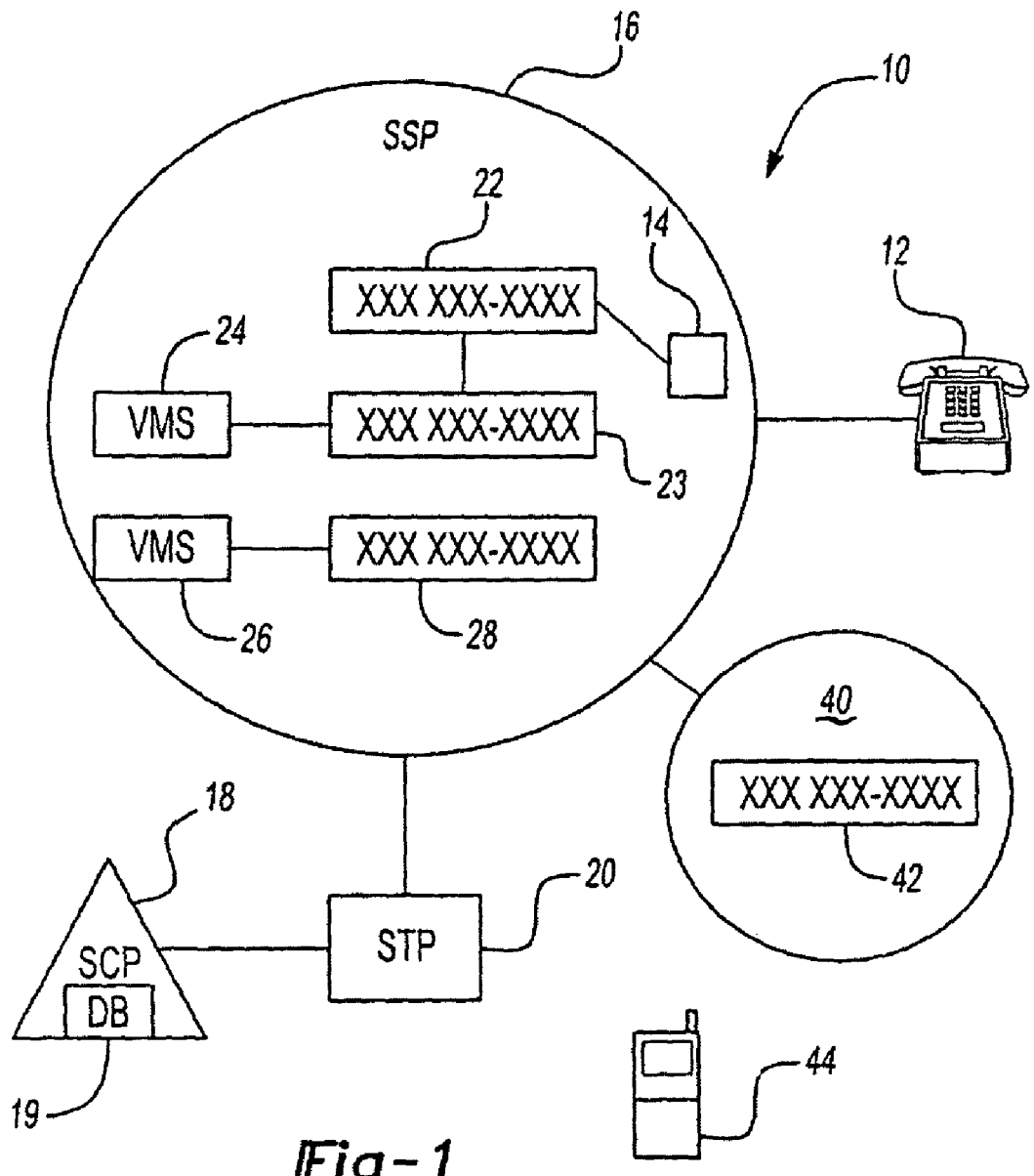
FIG. 1 is a schematic of the call handling system of the present invention as implemented in an Advanced Intelligent Network.

As shown in FIG. 1, the telecommunication system 10 of the present invention includes a first subscriber line 12 connected by local telephone lines to a first Service Switching Point (SSP) 16. The SSP 16 is a well-known AIN programmable switch that recognizes numerous different AIN triggers on the subscriber line 12. In response to the various triggers, the SSP 16 queries a Service Control Point (SCP) 18 having a database 19 via a Signaling Transfer Point (STP) 20 for instructions regarding call routing or call processing.

The SSP 16 is preferably connected to a plurality of subscriber lines, although only subscriber line 12 is shown for simplicity. Each of the subscriber lines, including subscriber line 12 is assigned a different specific digit string 22 (i.e. telephone number). Calls to the specific digit string 22 are routed to the subscriber line 12 by the SSP 16. The SSP 16 also includes a forward-to telephone number 23, which is also associated with subscriber line 12 and specific digit string 22. In this example, the forward-to number 23 is a switch-based call-forward provided by the SSP 16 and the forward-to number is for a voicemail box 24 provided by the SSP 16. As is known, the call-forward may be implemented after a predetermined number of rings at subscriber line 12 (call-forward no answer) and/or when the subscriber line 12 is busy (call-forward busy), for example. The SSP 16 includes other subscriber lines (not shown) and other voicemail boxes, including voicemail box 26 having telephone number 28.

One of the AIN triggers recognized by the SSP 16 is an Off-Hook Delay (OHD) trigger. The OHD trigger is triggered by calls from the subscriber line 12, including switch-based forwarding of calls from subscriber line 12, including calls forwarded to voicemail box 24. In the present invention, the OHD trigger is used to detect that the SSP 16 is attempting a switch-based call-forward.

One application of the present invention involves a wireless communication system 40, which can be integrated in any known manner with the wired system. The wireless system 40 includes a telephone number 42 associated with a wireless subscriber line 44. In accordance with a known technique for providing multi-line extensions, calls to subscriber line 12 (i.e. to specific digit string 22) may be forwarded by the AIN system to both specific digit string 22 and specific digit string 42, in which case both the wired subscriber line 12 and wireless subscriber line 40 ring simultaneously and the call may be answered at either line.

Figure 2:
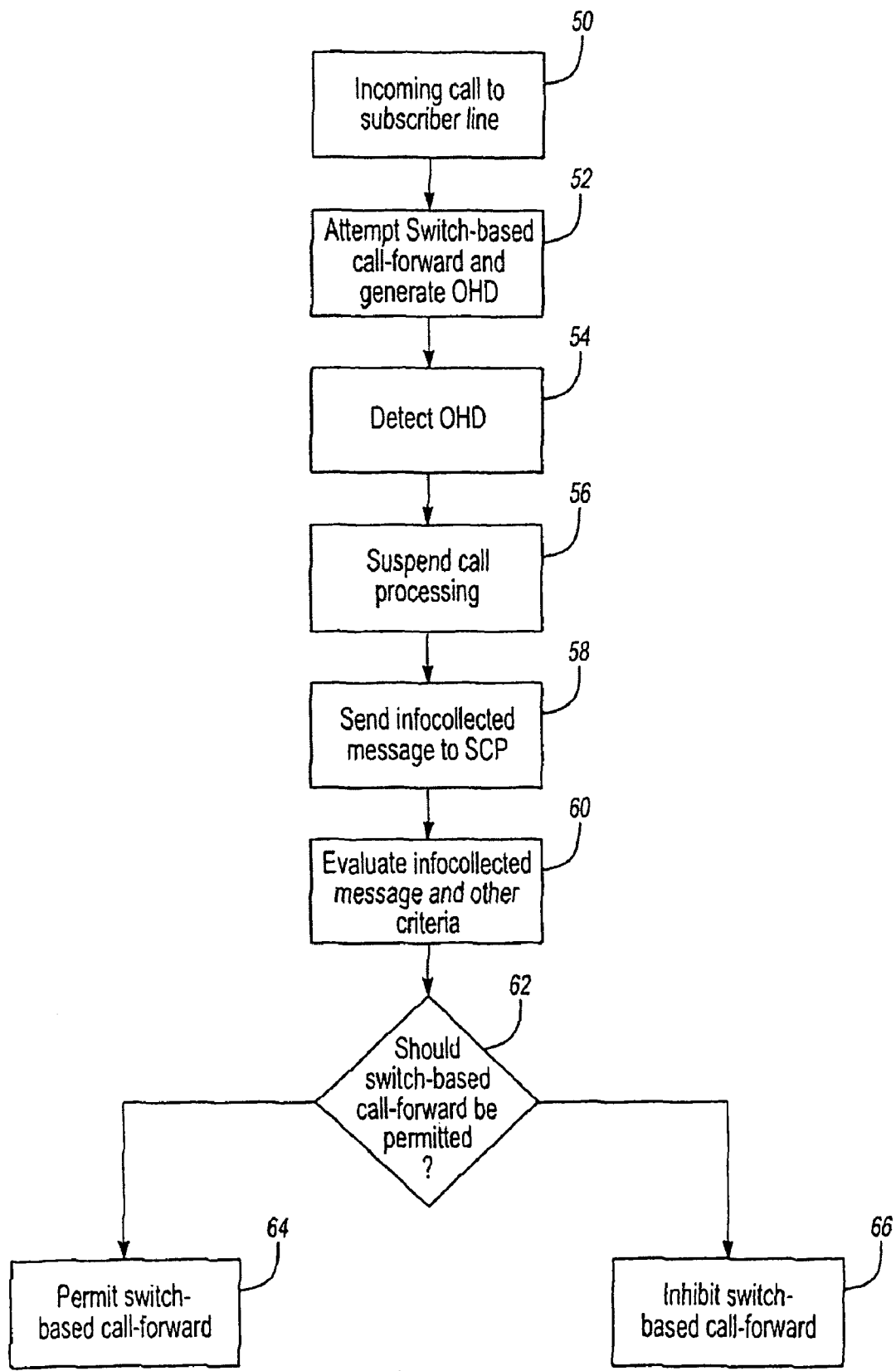
FIG. 2 is a flowchart illustrating the operation of the present invention.

The operation of the telecommunication system 10 of FIG. 1 will be described with respect to the flowchart in FIG. 2. In step 50, an incoming call to subscriber line 12 is received by SSP 16. In step 52, the SSP 16 attempts a switch-based call-forward to forward-to number 23. The forward-to number 23 may be a telephone number for a different subscriber line or, in this example, a voicemail box 24. In the example described herein, the switch-based forwarding features are call-forward busy and call-forward no answer, but it should be recognized that the present invention could be utilized with any switch-based forwarding feature. The call-forward to the forward-to telephone number 23 also generates an OHD trigger in step 52.

The OHD trigger is detected by the SSP 16 in step 54, which, in response to the OHD trigger, suspends call processing and at least initially inhibits forwarding the call to the forward-to telephone number 23 in step 56. Also in response to the OHD trigger, the SSP 16 sends an infocollected message to the SCP 18 in step 58. The infocollected message includes the specific digit string 22 and the forward-to number 23.

In step 60, the SCP 18 analyzes the infocollected message and other criteria and determines whether the call-forward should be permitted in step 62. Based upon the determination in step 62, the switch-based call-forward by SSP 16 is either permitted in step 64 or inhibited in step 66.

Among other possible criteria evaluated in step 62, SCP 18 determines whether the telephone number being called by subscriber line 12 is the voicemail 24 for the associated subscriber line 12. Generally, the determination as to whether the call-forward should be permitted by the SCP 18 can be based upon a determination as to whether the attempted call is to voicemail, the time of day, the day of the week, etc. Based upon the criteria evaluated in step 62, the switch-based call-forward is either permitted in step 64 or inhibited in step 66.

For a first example, a business customer may want calls to subscriber line 12 forwarded to the business voicemail 24 during regular business hours and to their residential voicemail 26 after normal business hours. This could be implemented in the present invention by using the switch-based call forwarding in SSP 16 during business hours for forwarding to business voicemail 24 and using AIN forwarding to residential voicemail 26 after hours. More specifically, in step 62, the SCP 18 evaluates whether the dialed digits of a call-forward from subscriber line 12 are to the forward-to number 23 corresponding to the associated voicemail box 24. If so, subscriber line 12 must either be busy or was not answered. SCP 18 also evaluates whether the current time of day is after regular business hours. During business hours, SCP 18 permits the switch-based call-forward in step 64 to the business voicemail box 24. After hours, SCP 18 inhibits the switch-based call-forward in step 66 and instead instructs SSP 16 to forward the call to the residential voicemail box 26.

A second example use for the present invention relates to multi-line extension service, where calls to a subscriber's telephone number are forwarded to a user's wireless telephone 44 as well as the user's wired subscriber line 12. Generally, the SSP 16 suspends processing of calls to telephone number 22, while the SCP 18 provides SSP 16 with the telephone number 42 of wireless telephone 44. The SSP 16 then forwards the call to both wired subscriber line 12 and wireless telephone 44. With reference to FIG. 2, this represents step 50. Both lines ring simultaneously and the call can be answered from either line 12 or 44. If the wired subscriber line 12 is not answered or is busy, the switch-based forwarding of the SSP 16 will attempt to forward the call to voicemail box 24 in step 52. The OHD is detected in step 54, all processing is suspended in step 56 and the infocollected message is sent to SCP 18 in step 58. In step 60, the SCP 18 analyzes the infocollected message, including whether the forward-to number is for the associated voicemail box 24 and other criteria and determines whether the call-forward should be permitted in step 62. For example, in step 62, the SCP 18 may determine that the switch-based call-forward should proceed in step 64 if the forward-to number is for the voicemail box 24 and during certain times of day or days of the week. For example, the switch-based call-forward to voicemail may be permitted after business hours or only for call-forward busy, or a combination of both. In this manner, the user can answer the call on the wireless telephone 44 without the voicemail box 24 of the wired subscriber line 12 picking up during the call.

The AIN architecture is well-documented and well-known to those skilled in the art and, except as otherwise described above, the operation of the AIN components shown in FIG. 1 is in accordance with published standards. In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric labels on method steps in the claims below are for convenience of reference by dependent claims, and do not signify a required order of performance of the method steps.

What is claimed is:

1. A method for routing calls in an Advanced Intelligent Network, the method comprising:
   detecting an off-hook delay trigger in a service switching point ("SSP"), the off-hook delay trigger comprising a forward-to number and indicating a switch-based call forward attempt from a subscriber line to the forward-to number;
   suspending call processing to the forward-to number based upon the detected off-hook delay trigger; and
   determining, while call processing is suspended, whether the call forward should be permitted, based on the forward-to number.

2. The method of claim 1, further comprising:
   sending a message to a service control point ("SCP") while call processing is suspended.

3. The method of claim 2 wherein the message includes the forward-to number to which the call-forward attempt is made.

4. The method of claim 3, further comprising:
   determining whether the forward-to number is a voicemail number;
   wherein determining whether the call forward should be permitted comprises determining whether the call forward should be permitted based on whether the forward-to number is a voicemail number.

5. The method of claim 4, wherein determining whether the call forward should be permitted comprises:
   preventing the call-forward based upon a determination that the forward-to number is a voicemail number.

6. The method of claim 5, further comprising:
   forwarding the call to more than one subscriber line prior to detecting an off-hook delay trigger.

7. The method of claim 1, wherein determining whether the call forward should be permitted comprises permitting the switch-based call forward.

8. The method of claim 1, further comprising:
   forwarding the call to voicemail.

9. The method of claim 1, further comprising:
   forwarding the call to a second subscriber line.

10. The method of claim 3, wherein the message is an infocollected message, and wherein the infocollected message further comprises a specific digit string associated with the subscriber line.

11. The method of claim 4, wherein determining whether the call forward should be permitted comprises:
    evaluating one or more criteria to determine whether the call should be forwarded to one or more numbers other than the forward-to number.

12. The method of claim 11, wherein the one or more criteria comprise a time of day.

13. The method of claim 11, wherein the one or more criteria comprise a day of week.

14. The method of claim 11, wherein determining whether the call forward should be permitted comprises:
   determining that the call should be forwarded to one or more numbers selected from the group consisting of a business number associated with the subscriber line, a residential number associated with the subscriber line, and a voicemail number associated with the subscriber line.

15. The method of claim 1, wherein the off-hook delay trigger indicates a call-forward on busy attempt or a call-forward on no answer attempt.

16. A system for routing calls, the system comprising:
   a service control point ("SCP"); and
   a service switching point ("SSP") in communication with the SCP and associated with a subscriber line, the a subscriber line having switch-based call forwarding associated therewith, the SSP being configured to:
   detect an off-hook delay trigger, the off-hook delay trigger comprising a forward-to number and indicating a switch-based call forward attempt from a subscriber line to the forward-to number;
   suspend call processing to the forward-to number based upon the detected off-hook delay trigger; and
   determine, while call processing is suspended, whether the call forward should be permitted, based on the forward-to number.

17. The system of claim 16, wherein the SSP is further configured to:
   send a message to the SCP while call processing is suspended, the message comprising the forward-to number.

18. The system of claim 17, wherein the message is an infocollected message, and wherein the infocollected message further comprises a specific digit string associated with the subscriber line.

19. The system of claim 16, wherein the SSP is further configured to:
   determine whether the forward-to number is a voicemail number;
   wherein determining whether the call forward should be permitted comprises determining whether the call forward should be permitted based on whether the forward-to number is a voicemail number.

20. The system of claim 19, wherein determining whether the call forward should be permitted further comprises:
   evaluating one or more criteria to determine whether the call should be forwarded to one or more numbers other than the forward-to number.

* * * * *